United States Patent [19]
McNeill et al.

[11] Patent Number: 6,167,052
[45] Date of Patent: Dec. 26, 2000

[54] ESTABLISHING CONNECTIVITY IN NETWORKS

[75] Inventors: Thomas G. McNeill, Orem; Joseph J. Ekstrom; Stephen S. Moss, both of Lindon, all of Utah

[73] Assignee: VPNX.com, Inc., Lindon, Utah

[21] Appl. No.: 09/067,761

[22] Filed: Apr. 27, 1998

[51] Int. Cl.[7] .................................................. H04L 12/66
[52] U.S. Cl. ........................................ 370/399; 370/401
[58] Field of Search ....................... 379/901; 395/200.68; 370/397, 399, 409, 401; 709/238

[56] References Cited

U.S. PATENT DOCUMENTS

| | | | |
|---|---|---|---|
| 4,922,486 | 5/1990 | Lindinsky et al. | 370/427 |
| 5,394,402 | 2/1995 | Ross | 370/402 |
| 5,684,800 | 11/1997 | Dobbins et al. | 370/401 |
| 5,761,201 | 6/1998 | Vaudreuil | 370/392 |
| 5,812,533 | 9/1998 | Cox et al. | 370/259 |
| 5,968,126 | 10/1999 | Ekstrom et al. | 709/225 |

FOREIGN PATENT DOCUMENTS

| | | |
|---|---|---|
| 0812 086 | 12/1997 | European Pat. Off. . |
| WO 95/01023 | 1/1995 | WIPO . |
| WO 98/02821 | 1/1998 | WIPO . |

OTHER PUBLICATIONS

S. Saunders: "Switch Puts Virtual LANs on Automatic Pilot. Agile's ATMizer switch is the first to automate setup of virtual workgroups" Data Communications Review, vol. 23, No. 12, Sep. 1, 1994, p. 45/46, XP000462380.

D. H. Axner: "Differing Approaches to Virtual LANs" Business Communications Review, Dec. 1993, pp. 42–45, XP000669940.

D.R. Cheriton et al., "Host Groups: A Multicast Extension for Datagram Internetworks", Proceedings of Ninth Data Communication Symposium (ACM), Sep. 10–13, 1985, pp. 172–179.

"Security Feature for Local Area Network Switches", IBM Technical Disclosure Bulletin, vol. 39, No. 9, Sep. 1996, pp. 137–143.

Bierer, et al., "NetWare® 4 for Professionals" (1993), pp. 1–9.

Held, "Virtual LANs: Construction, Implementation, and Management" (John Wiley & Sons, Inc., New York 1997), pp. 233–249.

U.S. application No. 08/832,011, J. Ekstrom et al., filed Apr. 2, 1997 entitled "User–Based Binding of Network Stations to Broadcast Domains".

Sant'Angelo et al., "Window® NT Server Survival Guide" (1996) "Copy held on reserve in the EIC library".

Siyan et al., "Internet Firewalls and Network Security" (New Riders Publishing, Indianapolis 1995), pp. 186–192.

(List continued on next page.)

*Primary Examiner*—Kenneth R. Coulter
*Attorney, Agent, or Firm*—Skjerven Morrill MacPherson LLP; Michael Shenker

[57] ABSTRACT

A network includes a number of domains ("layer 2 domains") interconnected by routers. Within each domain, traffic is forwarded based on MAC addresses (or other data link layer addresses). The routers route traffic based on IP addresses or other network layer addresses. To restrict network connectivity, a network administrator specifies connectivity groups each of which is a group of sub-networks that are allowed to communicate. The administrator also specifies which entities (MAC addresses, ports, or user names) belong to the same group. The entities may be in the same or different domains. A computer system automatically creates access control lists for routers to allow or deny traffic as specified by the administrator. The computer system also creates VLANs to allow or deny traffic as specified, wherein each VLAN is part of a domain or is a whole domain. Connectivity within each domain is restricted by VLANs and connectivity between domains is restricted by access control lists.

58 Claims, 2 Drawing Sheets

OTHER PUBLICATIONS

Cheswick et al., "Firewalls and Internet Security: Repelling the Wily Hacker" (Addison–Wesley Publishing Co., Reading, MA 1994), pp. 94–109.

Cisco Systems, Inc., "Increasing Security on IP Networks", internet document located at http://www.cisco.com/warp/customer/701/31.html, Mar. 20, 1997, 16 pages.

M. Williams, D. Hamilton, "Programming Window NT 4 Unleashed", Sams Publishing, 1996.

Marint McNealis, "New Cisco IOS VLAN Services Make 'Virtual' a Reality", Cisco Systems Inc. Jun. 6, 1995. (5 pages).

"Configuring Ethernet and Fast Ethernet Software", Cisco Systems, Inc. website (http://www/cisco.co.../sw_confg/80857.htm), 1996. (14 pages).

"Product Overview (Catalyst 5000)", Cisco Systems, Inc. website (http://www.cisco.co.../onfg/80847.htm#HDR1), 1996. (18 pages).

"Configuring the Software (Catalyst 5000)", Cisco Systems, Inc. website, (http://www.cisco.co.../sw_confg/80845.htm), 1996. (19 pages).

"Supported Protocols and MIBs (Catalyst 1200)", Cisco Systems, Inc. website, (http://www.cisco.co...at1200/ug/61642.htm), 1996. (3 pages).

"Creating a Configuration File", Cisco Systems, Inc. website, (http://www.cisco.co.../sw_confg/80858.htm), 1996. (2 pages).

"Command Line Interfaces", Cisco Systems, Inc. website, (http://www.cisco.co.../sw_confg/80839.htm), 1996. (25 pages).

"Command References", Cisco Systems, Inc. website, (http://cisco.co.../sw_confg/80842.htm), 1996. (210 pages).

"Downloading Files", Cisco Systems, Inc. website, (http://www.cisco.co.../sw_confg/80843.htm), 1996. (14 pages).

1

ESTABLISHING CONNECTIVITY IN NETWORKS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to networks, and more particularly to establishing connectivity in networks.

Some networks restrict connectivity for security reasons or in order to reduce network traffic. Thus, some stations in the network are allowed to communicate with each other, while other stations are not. Connectivity could be allowed or disallowed by establishing physical communication links between stations that are allowed to communicate and by not providing physical links between stations that are not allowed to communicate. However, this is impractical because it requires a separate configuration of physical links for each set of connectivity constraints. Therefore, techniques have been developed to establish or change network connectivity by issuing commands to appropriate network devices.

This is illustrated in FIGS. 1 and 2. (These figures also illustrate some aspects of the invention and thus are not prior art.) Network 110 is an enterprise network suitable for interconnecting a large organization. Network 110 includes "layer 2 domains" 116P, 116Q, 116R, 116S, 116T. (The term "layer 2" refers to the data link layer of the OSI reference model described in D. Bierer et al., "NetWare® 4 for Professionals" (1993), pages 1–9 incorporated herein by reference.) Stations 124 that belong to the same layer 2 domain 116 (e.g. stations 124.1, 124.2 in domain 116P) can communicate with each other using their MAC addresses ("layer 2" addresses). A MAC (Medium Access Controller) address is a physical address burned into the station's network interface card (NIC) or established by setting NIC switches. Some or all of domains 116 may include one or more network switches 128 (not to be confused with NIC switches). Switches 128 of each domain 116 forward traffic between stations 124 using the stations' MAC addresses.

Stations in different layer 2 domains (e.g. stations 124.1, 124.3) cannot communicate with each other using exclusively MAC addresses. They communicate using their IP addresses which are logical addresses. Routers 130.1, 130.2, 130.3 route traffic between the domains 116 based on the stations' IP addresses, translating between IP addresses and MAC addresses as needed.

Within some domains 116, connectivity can be restricted using virtual LANs (or VLANs). For example, domain 116P contains three VLANs 140a, 140b, 140c (FIG. 2). Stations 124 in domain 116P can communicate with each other at layer 2 (i.e., using their layer 2 addresses) only if they belong to the same VLAN. Thus, as shown in FIG. 1, stations 124.1, 124.2 belong to VLAN 140a and hence can communicate.

VLANs are implemented by the LAN switches 128. More particularly, switches 128 will forward a packet only between stations within the same VLAN. (Switches 128 are called "VLAN-capable" because they are capable to restrict traffic to a VLAN. Some layer 2 domains, for example, domain 116S or 116T, may include no VLAN-capable switches.)

Connectivity between different layer 2 domains is restricted by routers 130. Routers 130 use access control lists (ACLs) that define connectivity restrictions based on IP addresses. See, for example, K. Siyan and C. Hare, "Internet Firewalls and Network Security" (1995), pages 187–192.

Creating access control lists and defining VLANs can be a confusing and laborious process for a network administrator. This process has to be often repeated in dynamic network environments in which stations, users and network services move from place to place, or get transferred from one organization to another without physically moving, or become added or deleted.

It is therefore desirable to facilitate establishing connectivity in networks.

SUMMARY

The present invention provides new methods and systems for establishing and constraining network connectivity. Some embodiments allow easy creation of VLANs and access control lists.

In some embodiments, the access control lists are created by a management station. The management station receives definitions of connectivity groups. Each connectivity group is a group of sub-networks. Traffic is to be allowed within each group. In some embodiments, each sub-network is identified as an IP subnet. The management station creates the access control lists from the information defining the connectivity groups.

In some embodiments, the management station also receives identification of shared sub-networks, and generates the ACLs which allow traffic between any shared sub-network and any sub-network in any connectivity group.

In some embodiments, the management station creates sub-domains, such as VLANs, by suitably configuring the domains. To configure the domains, a network administrator enters for each connectivity group information defining traffic that belongs to the group. Examples of such information are lists of entities (such as ports of switches, or MAC addresses of network stations, or user names specified at log-on by users) that belong to the same connectivity group. Entities from different connectivity groups are not allowed to communicate. A connectivity group may contain entities from different layer 2 domains. Entities may be assigned to connectivity groups without specifying which entity belongs to which VLAN. The management station determines which entities in the same group belong to a single domain, and places such entities into an appropriate VLAN.

In some embodiments, information identifying traffic in a connectivity group includes values of bits of layer 2 packets.

The invention is not limited to layer 2 domains or to switches or routers. Other features and advantages of the invention are described below. The invention is defined by the appended claims.

BRIEF DESCRIPTIONS OF THE DRAWINGS

DETAILED DESCRIPTION OF PREFERRED EMBODIMENTS

Network 110 includes five layer-2 domains 116. These domains are called "layer-2" because packet addressing within each domain is performed based on packet contents at the OSI reference model layer 2 (data link layer). Routers 130 route traffic based on packet contents at layer 3 (network layer). In particular, IP addresses are layer 3 addresses. However, the present invention is not limited to layers 2 or 3 or to networks conforming to the OSI reference model.

Figure 1:
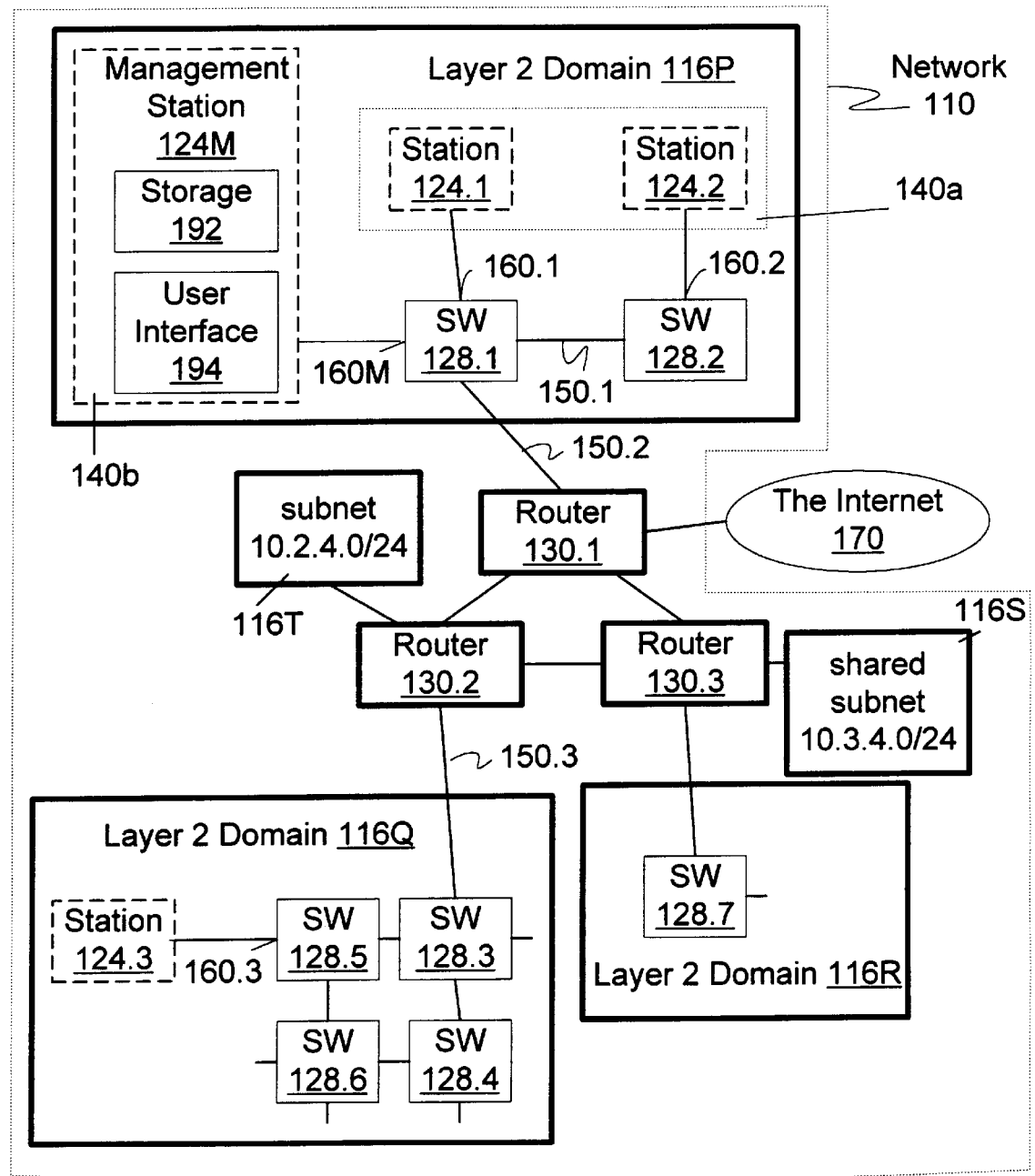
FIG. 1 is a block diagram of a network in which connectivity is established according to the present invention.

Domain 116P includes VLAN-capable switches 128.1, 128.2 that forward traffic based on MAC addresses. The switches are connected to each other by trunk 150.1. Each switch has one or more ports, each connected to a network segment. Thus, port 160.1 of switch 128.1 is connected to a network segment containing the station 124.1. Port 160.2 of switch 128.2 is connected to a network segment containing the station 124.2. In FIG. 1, each network segment contains a single station. In some embodiments, a network segment contains multiple stations.

Port 160M of switch 128.1 is connected to management station 124M used to create connectivity groups as described below.

Switch 128.1 is connected to router 130.1 by trunk 150.2. Router 130.1 is connected to router 130.2, router 130.3, and the Internet 170. Router 130.2 is connected to router 130.3. Router 130.2 is connected by trunk 150.3 to VLAN-capable switch 128.3 of domain 116Q. Domain 116Q contains also VLAN-capable switches 128.4, 128.5, and 128.6 each of which is connected to one or more network segments similarly to switches 128.1, 128.2. only the segment containing the station 124.3 is shown. Switches 128 of domain 116Q are also connected to one another.

Router 130.2 is connected to layer 2 domain 116T.

Router 130.3 is connected to VLAN-capable switch 128.7 of domain 116R and to layer 2 domain 116S. Switch 128.7 is connected to network segments (not shown) similarly to switches 128.1, 128.2. Domains 116S, 116T include zero or more switches (not shown).

In some embodiments, one or more domains 116 do not have any switches or have non-VLAN capable switches, hubs or concentrators.

As stated above, communications between different domains use IP addresses. For example, to send a packet to station 124.3, station 124.1 inserts into the packet the IP address of station 124.3 and the MAC address of router 130.1 as the logical and physical destination addresses, respectively. Router 130.1 replaces the destination MAC address with the MAC address of router 130.2 and replaces the source MAC address of station 124.1 with the MAC address of router 130.1. Then router 130.1 sends the packet to router 130.2. Router 130.2 replaces the source MAC address in the packet with its own MAC address and the destination MAC address with the MAC address of station 124.3, and sends the packet to switch 128.3. Switch 128.3 forwards the packet to station 124.3 through switch 128.5.

Domain 116P includes non-overlapping VLANs 140a, 140b, 140c (FIG. 2); domain 116Q includes non-overlapping VLANs 140d, 140e, 140f; domain 116R includes non-overlapping VLANs 140g, 140h, 140i. A station membership in a VLAN is defined by a switch port 160 to which the station is connected, or by the station's MAC address, or by the user name of the user who logged on at the station. Establishing VLAN membership based on a port or a MAC addresses is described in G. Held, "Virtual LANs: Construction, Implementation, and Management" (1997), pages 233–249 incorporated herein by reference.

Establishing VLAN membership by the user name is described in Appendix A. See also U.S. patent application Ser. No. 08/832,011 filed Apr. 2, 1997 by J. Ekstrom et al. entitled "User-Based Binding of Network Stations to Broadcast Domains", now U.S. Pat. No. 5,968,126 which is incorporated herein by reference. In some embodiments, a VLAN 140 combines stations identified by ports, stations identified by MAC addresses, and/or stations identified by user names.

Domains 116S, 116T may or may not include any VLANs.

Management station 124M belongs to VLAN 140b. Station 124M can communicate with any switch 128 and any router 130.

In some embodiments, (1) all the switches 128 are switches of type Catalyst™ available from Cisco, Inc. of San Jose, Calif.; and (2) routers 130 are routers available from Cisco, Inc. and described in the document available from Cisco, Inc. as part number 78-2040-01, incorporated herein by reference.

Network 110 includes connectivity groups that may include entities (non-trunk switch ports 160, MAC addresses, or user names) in different domains 116. For example, a connectivity group may consist of all the entities in VLANs 140a, 140d, 140g. Communication is allowed between entities in the same connectivity group, but is disallowed between entities in different connectivity groups. In particular, switches 128 and routers 130 will not route a packet from a station 124 in one connectivity group to a station 124 in another connectivity group.

As is well known, a VLAN is a broadcast domain (also called a "layer 2 broadcast domain" or "layer 2 BD" herein). In contrast, a connectivity group is not necessarily a broadcast domain. Thus, in some embodiments, broadcast or multicast traffic is confined to a single VLAN.

VLANs are also called herein "virtual broadcast domains" or VBDs. A VBD is a broadcast domain that can be defined without necessarily changing physical connections (e.g. cabling) in a network.

Management station 124M includes storage 192 for storing programs and data and also includes user interface devices 194 such as a keyboard, a screen, and/or other interface devices.

Appendix B illustrates a process of creating connectivity groups (and in particular creating VLANs 140 and router access control lists) in some embodiments. This process will now be described on an example of the VLANs of FIG. 1 and the following three connectivity groups:

Group 1 consists of VLANs 140a, 140d, and 140g;

Group 2 consists of VLANs 140b, 140e, and 140h; this group will be designated as a management connectivity group containing the management station 124M;

Group 3 consists of VLANs 140c, 140f, and 140i.

In some embodiments, layer 2 domain 116S is a broadcast domain. The process of Appendix B configures domain 116S as a shared IP subnet which is allowed to communicate with any connectivity group. Of note, each layer 2 broadcast domain is an IP subnet or a combination of IP subnets.

The process of Appendix B leaves layer 2 domain 116T and the associated subnet "unmanaged", i.e., no ACL is created for the corresponding router interface(s) and, further, the subnet 116T is not explicitly mentioned in any ACLs created by the process. Hence, domain 116T can receive traffic from any connectivity group but traffic from domain 116T to any connectivity group will be filtered (blocked) by routers 130.

In some embodiments, a single layer 2 domain includes managed and unmanaged subnets.

The process of Appendix B may be performed before or after any VLANs or connectivity groups have been established in network 110. In some embodiments, the Appendix B process is first performed to establish a single "management connectivity group" containing all the communicating entities in all domains 116 (except, perhaps, the entities of shared and unmanaged domains such as domains 116S, 116T). The management group enables the management station 124M to communicate with all the switches and routers. Then the Appendix B process or the maintenance processes of Appendix G are performed to establish groups 1, 2, 3 described above or any other groups. Establishing such groups is facilitated by the management station capability to communicate with the switches and routers.

Alternatively, only the ports of switches 128 and the management station 124M are placed into the management connectivity group. In some embodiments, only those ports of switches 128 are placed into the management connectivity group that are needed to allow the management station 124M to communicate with all the VLAN-capable switches and with all the routers.

In the embodiment described below, no management connectivity group is presumed to exist when the Appendix B process starts.

Figure 2:
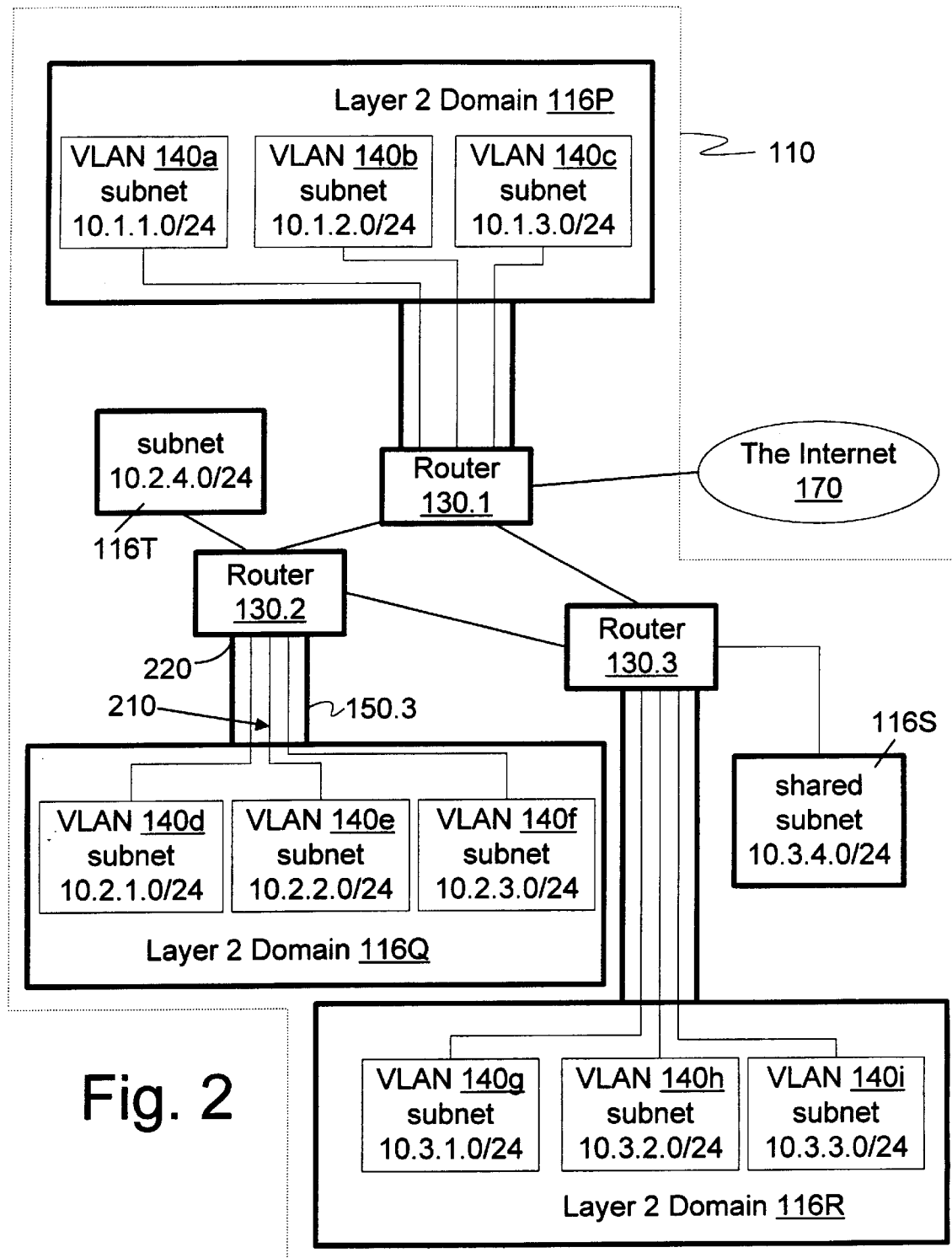
FIG. 2 is a block diagram that illustrates VLANs and router interfaces in the network of FIG. 1.

Before the process of Appendix B is started, each router 130 is configured so that one or more IP subnets are assigned to each router interface 210 (FIG. 2). (Of note, we use the term "interface" for what some Cisco documentation calls "subinterface"). Later when the process of Appendix B is completed, each router 130 will have a separate interface for each VLAN 140 in the domain 116 to which the router is connected.

Of note, since each VLAN 140 is a subnet or a combination of subnets, routers 130 essentially make forwarding decisions based on VLAN even though the routing software is not explicitly aware of VLANs. The routers are connected to the domains through the routers' trunk ports (such as trunk port 220), and each interface is a logical sub-port of the trunk port.

As is well known, trunk ports of switches and routers (i.e. ports connected to trunks 150 that interconnect switches or switches and routers) carry traffic for multiple VLANs. The traffic over the trunk ports uses a trunking protocol in which each packet is encapsulated in a larger packet that is tagged with the identification of the VLAN to which the packet is assigned. The VLAN tag allows the receiving switch 128 to identify the packet's VLAN if the VLAN membership is defined by a port rather than a MAC address.

Routers 130 understand the trunking protocol and treat traffic from different VLANs on the same trunk port as if the traffic from each VLAN had arrived on a separate port assigned to the VLAN.

Instead of trunks, some embodiments use separate physical connections between a router and a layer 2 domain to carry traffic for separate VLANs.

Each interface has a gateway address in each subnet handled by the interface. The gateway address is the router's address in the subnet.

Appendix C illustrates the data base created by some steps of Appendix B in storage 192.

At step M5 (Appendix B), the network administrator provides to management station 124M the IP address range of network 110. In the example of Appendix B, the address range is 10.0.0.0/8. Within network 110, each subnet has a subnet mask of 255.255.255.0.

IP address ranges and subnets have the form 10.0.0.0/8 (the subnet mask has 8 most significant 1's followed by all 0's) or as a combination of the IP address (10.0.0.0) and the net mask (255.0.0.0).

Management station 124M enters the IP address range of network 110 into its data base as shown at I in Appendix C.

Step M7 is performed by the administrator as described in Appendix B. Station 124M creates data structures I2 (Appendix C). This information, as well as other information in Appendix C, is organized differently in different embodiments. For example, in some embodiments, item I2-1 (addresses of switches) is stored as a list of addresses for each domain. In other embodiments, the same information is stored as pairs of an address and the respective domain. Other data structures are used in other embodiments.

At step M10, the network administrator defines VLANs 140. Defining VLANs involves providing VLAN identifiers to station 124M and to each switch 128 in the respective domain 116. A VLAN identifier is an identifier understandable to the switches 128, i.e., a VLAN number. Each of switches 128.1, 128.2 receives identifiers of VLANs 140a, 140b, 140c; switch 128.7 receives identifiers of VLANs 140g, 140h, 140i, and so on. Defining VLANs does not involve defining which entities (ports, MAC addresses or user names) belong to each VLAN.

In some embodiments, the administrator enters the VLAN identifiers into each switch 128 directly. In other embodiments, the administrator enters the VLAN identifiers into a controlling switch 128 of each domain 116. The controlling switch sends the identifiers to the other switches (if any) in the same domain. In still other embodiments, the administrator provides this information to switches 128 remotely from station 124M using, for example, the Telnet or SNMP protocol.

Station 124M stores this information in its data base as shown at I3 in Appendix C.

At step M14, the network administrator enters into station 124M the information I4 (Appendix C). In FIGS. 1 and 2, a separate subnet is assigned to each layer 2 BD so that there is a one-to-one correspondence between layer 2 BDs and IP subnets. The subnets are shown in FIG. 2 and in the following Table 1:

TABLE 1

| LAYER 2 BD | SUBNET |
|---|---|
| 140a | 10.1.1.0/24 |
| 140b | 10.1.2.0/24 |
| 140c | 10.1.3.0/24 |
| 140d | 10.2.1.0/24 |
| 140e | 10.2.2.0/24 |
| 140f | 10.2.3.0/24 |
| 140g | 10.3.1.0/24 |
| 140h | 10.3.2.0/24 |
| 140i | 10.3.3.0/24 |
| 116S | 10.3.4.0/24 |
| 116T | 10.2.4.0/24 |

In some embodiments, a number of subnets are assigned to a layer 2 BD. Subnets are provided to station 124M using the subnet address/number of 1's in the subnet mask notation or the subnet address and mask notation.

Also at step M14, network 110 is configured to assign IP addresses in each VLAN from the corresponding IP subnet (s). Thus, in some Windows NT™ embodiments, the DHCP server is configured to assign IP addresses in respective subnets. (Windows NT is described, for example, in R. Sant'Angelo et al., "Windows® NT Server Survival Guide" (1996) incorporated herein by reference.) In some embodiments, a DHCP server is attached to one of the subnets on a router 130. The router is configured to forward DHCP requests from all subnets directly attached to the router to this DHCP server. In other embodiments, a separate DHCP server is provided on each subnet.

At step M20, for each connectivity group, the administrator enters into station 124M the IP subnets that are members of the connectivity group (i.e., the IP subnets that are part of layer 2 BDs that are members of the connectivity groups). Thus, the administrator enters the subnets in VLANs 140$a$, 140$d$, 140$g$ for connectivity group 1; the subnets in VLANs 140$b$, 140$e$, 140$h$ for group 2; and the subnets in VLANs 140$c$, 140$f$, 140$i$ for group 3. Alternatively, for each connectivity group, the administrator enters identifications of layer 2 BDs members of the connectivity group. In either case, to make every router reachable from the management station 124M, the administrator may enter IP subnets which are to be members of the management connectivity group. In some embodiments, each router has at least one gateway IP address in a shared subnet or a subnet member of the management connectivity group.

Some embodiments do not require every router to be reachable from the management station. Thus, routers directly connected only to unmanaged subnets and to other routers do not have to be reachable in some embodiments.

Item I5 (Appendix C) is created at step M20.

If multiple subnets are assigned to a single layer 2 BD, they are all assigned to the same connectivity group.

At step M30, the administrator enters into station 124M the entities belonging to each connectivity group. Item I6 (Appendix C) is created. For example, for connectivity group 1, the administrator enters switch ports 160.1, 160.2, 160.3 (assuming station 124.3 connected to port 160.3 belongs to VLAN 140$d$), and other ports, MAC addresses, and/or user names belonging to VLANs 140$a$, 140$d$, 140$g$. In some embodiments, the administrator does not have to remember to which domain or VLAN the ports, MAC addresses or user names belong.

The ports 160 are identified in station 124M by labels which can be assigned by the administrator so as to be easy to reference. For example, if a port is connected to a station 124 used by a user named Fred, the administrator can assign the label "Fred" to the port, and at step M30 can enter "Fred" to assign this port to a connectivity group. Assigning MAC addresses to connectivity groups is similar.

At step M40, the administrator enters into management station 124M the information I7 and I8 (Appendix C).

At step M45, station 124M creates VLANs 140, placing each entity into the appropriate VLAN, as shown in Appendix D. In Appendix D, numbers in parenthesis refer to data base items of Appendix C that are used in the corresponding steps of Appendix D.

In Appendix D, if an entity E of a connectivity group is a port 160 of a VLAN-capable switch (step V1), the entity is placed only into the VLAN in the domain 116 to which the port belongs. In contrast, if the entity is a MAC address (step V2) or a user name (step V3), the entity is placed into every VLAN in the connectivity group. In case of a MAC address, this allows the station having that MAC address to be connected in any domain 116 that includes a VLAN in that connectivity group. Thus, a portable computer (for example a laptop computer) having a MAC address in connectivity group 1 can be connected to domain 116P, 116Q, 116R. If the computer is connected to domain 116P, the switches 128.1, 128.2 receiving packets having the computer's MAC address as the source address will place the computer into VLAN 140$a$. Similarly, if the computer is connected to domain 116Q, it will be placed into VLAN 140$d$; and so on.

Similarly, a user name is placed into every VLAN 140 in the connectivity group. If the user logs on in domain 116P, a request to the UBNC server to switch the user to the appropriate VLAN will come from domain 116P. If, for example, the user name is in connectivity group 1, the UBNC server will place the user into VLAN 140$a$. Similarly, if the user logs on in domain 116Q or 116R, the UBNC server will place the user in VLAN 140$d$ or 140$g$ respectively.

In step V3, "Embodiment 1" does not require the UBNC server to know anything about connectivity groups. Station 124M tells the UBNC server which VLAN is assigned to the user name in each domain 116 (step V3-2). In Embodiment 2, the UBNC server knows which VLAN belongs to which connectivity group (this information can be provided to the UBNC server directly or remotely, for example, from station 124M). Therefore, at step V3-1 of Embodiment 2 the station 124M does not inform the UBNC server which VLANs are assigned to the user. When the user logs on, the UBNC server determines the user's VLAN from the user's connectivity group and from the domain 116 in which the log-on occurred. The domain 116 is determined from the user's IP address since the UBNC data base includes the IP subnet(s) associated with each VLAN in each domain 116. In some embodiments, the UBNC server runs on management station 124M.

At step M50 (Appendix B), station 124M creates router access control lists by executing a program shown in Appendix E. A separate access control list is created for each router interface to which a subnet member of a connectivity group is directly connected. The program of Appendix E will be explained on the example of interface 210 from router 130.2 to VLAN 140$e$.

For each router interface, if the corresponding subnet belongs to a connectivity group, steps A1 through A5 create an access control list such as shown in Appendix F. The line numbers in Appendix F (e.g. AL1-1) correspond to the step numbers of Appendix E. Thus, step A (Appendix E) creates line AL1-1, step A2 creates lines AL1-2a and AL1-2b, and so on.

Appendix F uses the syntax used by some routers available from Cisco, Inc. of San Jose, Calif. This syntax is described in K. Siyan and C. Hare, "Internet Firewalls and Network Security" (1995), pages 186–191 incorporated herein by reference. The line numbers (such as AL1-1) are not part of the access control list. Further, text starting with an exclamation point "!" and running to the end of the line is a comment ignored by the routers. These comments are omitted in some embodiments.

Step A1 creates lines that allow traffic to the interface 210 from each shared subnet such as subnet 116S. The program writes to the access control list the words "access-list", the access control list number (generated sequentially by the program itself in some embodiments), the words "permit ip", the IP address of the shared subnet, and the wildcard-mask of 0.0.0.255. (A 0 bit in the wildcard-mask indicates that the corresponding bit of the source IP address is used by the router in comparisons with incoming packet IPs; a 1 bit in the wildcard-mask indicates that the corresponding bit is not used.)

The wildcard-mask 0.0.0.255 in line AL1-1 is determined by inverting the subnet mask.

Step A2 creates lines, such as lines AL1-2a, AL1-2b, which allow traffic from every other subnet (i.e. layer 2 BD) in the same connectivity group. Line AL1-2a allows traffic from subnet 10.1.2.0/24 (VLAN 140$b$). Line AL1-2b allows traffic from subnet 10.3.2.0/24 (VLAN 140$h$).

Step A3 creates line AL1-3 denying traffic from all the other stations in network 110. (Of note, when the router receives a packet, the router tests the packet starting from the beginning of the access control list. When a line that applies to the packet is found, the rest of the access control list is ignored.) The wildcard-mask is obtained by inverting the IP address range mask of network 110.

Step A4 creates the line AL1-4 allowing traffic from any station outside the network 110, including traffic from the Internet 170.

In some embodiments, before step M50 the administrator indicates to management station 124M, for each subnet in a connectivity group, whether the traffic from the Internet to the subnet is allowed. If the traffic is denied, step A4 is omitted for the corresponding interface, and step A3 creates a "deny ip any" line instead of line AL1-3.

Step A5 is performed as described in Appendix E.

If the router interface is not connected to a BD member of a connectivity group but is connected to a shared or unmanaged subnet (e.g. 160S) or the Internet 170, no ACL is created, making the subnet or the Internet accessible from any other subnet.

In some embodiments, at step M40 of Appendix B, the administrator specifies what access is to be provided to each shared subnet, and the process of Appendix E creates an appropriate access control list using methods known in the art. For example, if the shared subnet is to be made accessible only from within network 110, the access control list will consist of lines such as:

access-list 1 permit ip 10.0.0.0 0.255.255.255
access-list 1 deny ip any

In other embodiments, such functionality is provided by an enterprise-wide firewall implemented in a router 130.1 or some other device (not shown).

Management station 124M instructs each router 130 to delete any existing access control lists and to substitute the new access control lists.

Some embodiments allow the network administrator to insert additional commands into the access control list. Thus, in some embodiments, before step M50, the administrator can specify for each subnet additional terms to be inserted into the access control list for the corresponding interface(s). More particularly, the administrator can specify terms to be inserted before step A, terms to be inserted between steps A2 and A3, terms to be inserted between steps A3 and A4, and terms to be inserted after step A4. In some embodiments, this technique is used to incorporate firewall functionality into the access control lists and thus eliminate the need for a separate enterprise-wide firewall.

In some embodiments, steps M10 and M20 are omitted. At step M45, for each connectivity group management station 124M creates a VLAN in each domain 116 having a VLAN-capable switch and having one or more entities in the connectivity group, and places the entities into the VLAN. (Thus, a VLAN is created in the domain if the domain has a port 160 in the connectivity group, or if the connectivity group includes a MAC address or a user name.) Station 124M also assigns an IP subnet (for example, 10.1.1.0/24) to each VLAN.

In some embodiments, VLAN membership is determined by other criteria than ports, MAC addresses or user names. Thus, in some embodiments, the VLAN membership is determined based on a packet content, for example, on a value of certain bits in the layer 2 packet. When a switch 128 receives a packet in which the value of such bits is in a predetermined set of one or more values, the switch places the packet's source MAC address, or the port 160 on which the packet arrived, into a corresponding VLAN. When a switch 128 transmits a packet on a trunk port connected to a router, the switch appends the packet's VLAN number to the packet. In routers 130, each VLAN number is associated with an interface. (This association is established when the interface is defined.) Thus, as in FIG. 2, each router 130 has a separate interface 210 for each IP subnet to which the router is directly connected. Connectivity groups are created similarly to the embodiment of Appendices B–G. In particular, at step M30 the administrator specifies, for each connectivity group, the rules determining what packets belong to the connectivity group. For example, a rule may state that packets having certain values of certain bits belong to a certain connectivity group.

In some embodiments, access control lists in routers 130 allow or deny traffic based on criteria other than IP addresses. For example, some criteria involve port numbers. See, for example, W. Cheswick and S. Bellovin, "Firewalls and Internet Security" (1994), pages 94–109 incorporated herein by reference. Further, some criteria specify traffic from the interface rather than to the interface. Before step M50, the administrator provides sufficient information to station 124M to create access control lists in accordance with such criteria.

In some embodiments, a VLAN 140 can be connected to different interfaces 210 of the same router for the purposes of redundancy. The two interfaces are assigned to the same subnet or to two different subnets. The respective ACLs implement the same restrictions for both interfaces.

If a VLAN is connected to interfaces of different routers, one of the routers could attempt to send data through the VLAN to the other router, possibly for routing the information to other stations accessible from the other router. In that case, the ACLs for the interface connected to the VLAN are constructed so as not to unduly restrict the traffic between the routers. In some embodiments, the VLAN subnet is made shared or unmanaged and not a member of any connectivity group.

Appendix G describes maintenance processes for changing connectivity in network 110. Any changes could be accomplished by rerunning the process of Appendix B. However, the Appendix G processes simplify maintenance in some embodiments.

Some embodiments omit step M50 (no ACLs are generated).

The embodiments described above illustrate but do not limit the invention. The invention is not limited to any particular networks, layers, switches, routers, operating systems, or any other hardware or software. The invention is not limited to enterprise networks. In some embodiments, the MAC addresses are not burned into the NICs but are generated by software. In some embodiments, all or part of the management software of Appendices B–G runs on a switch 128 or a router 130 rather than a station 124. The software is distributed in some embodiments.

In some embodiments, domains 116 use other protocols than layer 2 protocols, and routers 130 route traffic based on other protocols than layer 3 protocols. Connectivity in each domain is determined based on other information than MAC addresses or layer 2 packet contents, and routers 130 allow or deny traffic based on other information than IP addresses. In some embodiments, routers 130 use IPX addresses. Some embodiments use NetWare or AppleTalk networks described in D. Bierer et al., "NetWare® 4 for Professionals" (1993) incorporated herein by reference. Other embodiments and variations are within the scope of the invention, as defined by the appended claims.

APPENDIX A

User Based Network Control (UBNC)

In some embodiments, VLAN membership is determined based on a user who logged on at the station. In some Windows NT™ embodiments, a UBNC server is provided accessible from all the VLANs (for example, the server is in a shared subnet). When a network station is powered up, it is placed in a "default" VLAN (a default VLAN exists in each layer 2 domain 116). The station gets an IP address from a DHCP server serving the default VLAN. When a user logs on at the station, the station sends a request to the UBNC server to switch the station to a VLAN associated with the user name given at the log-on. The request contains the user name, the MAC address of the station, and the current IP address of the station. The UBNC server determines the associated VLAN from a UBNC server database. In some embodiments, for each user name, the database contains identification of associated VLAN(s). In other embodiments, the database contains the following information provided by the management station:

(A) for each user name, an identification of the connectivity group to which the user name belongs;

(B) identifications of VLANs belonging to each connectivity group;

(C) for each VLAN, the associated subnet(s).

When the UBNC server receives the request, the server sends to the requesting station: (1) an indication of whether the station will be switched to a different VLAN (if the user logged on when the station was not in the default VLAN, it is possible that the switching is not required; also, the switching will not be performed if the user logged on in a layer 2 BD in which no VLANs are defined), and (2) the IP subnet and subnet mask of the VLAN assigned to the user. Next, the UBNC server waits for the station to release its DHCP lease. Then the UBNC server sends an appropriate command to a switch or switches 128 in the layer 2 domain 116 that contains the station. The switches place the station into the VLAN assigned to the user.

After receiving the response from the UBNC server, the station releases its DHCP lease and then waits for a period of time to allow the server to switch the station to the assigned VLAN. After that period of time, the station assumes that it has been switched, and issues a request for a new DHCP lease. In response, the station receives a new IP address. The station checks the new IP against the IP subnet and subnet mask received from the UBNC server. If the new IP is not in the subnet, the station repeats the procedure by issuing a new request to the UBNC server. The new IP may be in a wrong subnet if the station had not been switched to the assigned VLAN when the station requested the new IP.

In some embodiments, default VLANs are omitted. In other embodiments, every station or a group of geographically proximate stations is assigned to a separate default VLAN to restrict communication until users are switched to their associated VLANs by the UBNC server. When a user logs off, the user station is returned to the appropriate default VLAN.

APPENDIX B

Creating Connectivity Groups

M5 Provide the IP address range (e.g. 10.0.0.0/8) of network 110 to management station 124M M7 Provide to management station 124M the information I2 (Appendix C).

M10 Define VLANs

M14 Assign IP subnets to layer 2 BDs

M20 For each connectivity group, provide to the management station IP subnets members of the group. Designate one connectivity group as the management connectivity group.

M30 Assign manageable entities (ports, MAC addresses and/or user names) to connectivity groups M40 Provide information I7 and I8 to the management station.

M45 Management station 124M places entities into appropriate VLANs (see Appendix D)

M50 Management station 124M creates access control lists for routers (see Appendix E)

APPENDIX C

Management Station Data Base

I1 IP address range of network 110

I2 For each domain 116:

I2-1 IP addresses of all VLAN-capable switches 128 in the domain 116

I2-2 Identifications of non-trunk ports 160 of each switch

I3 For each domain 116, identifications of VLANs in the domain

I4 For each layer 2 BD, an indication whether or not the BD is a VLAN, and the IP subnet(s) included in the BD. If the BD is a VLAN, the identification of the VLAN.

I5 For each connectivity group, IP subnets belonging to the connectivity group

I6 For each connectivity group, entities (ports, MAC addresses, and/or user names) that belong to the connectivity group I7 For each router interface:

I7-1 Associated subnets, if any

I7–2 A flag indicating whether or not the interface is connected to a VLAN-capable layer 2 domain I8 List of all shared subnets in network 110

APPENDIX D

VLAN Creation

For each connectivity group CG, for each entity E in the connectivity group (I6):

V1 If the entity E is a port 160 of a VLAN-capable switch 128:

V1-1 Find the domain 116-E (one of 116P, 116Q, 116R) to which the port belongs (I2-2, I2-1)

V1-2 Find the VLAN which is both in the connectivity group CG and in domain 116-E (I3, I4, I5)

V1-3 Place the port E into the VLAN by sending commands to the switches 128 of domain 116-E or to a controlling switch 128 of domain 116-E V2 Else if the entity E is a MAC address, then for each VLAN in the connectivity group CG (I4, I5):

V2-1 Determine the domain 116-V (one of 116P, 116Q, 116R) containing the VLAN (I3)

V2-2 Place the MAC address E into the VLAN by sending the appropriate commands to all the switches 128, or to the controlling switch 128, of the domain 116-V V3 Else if entity E is a user name: Embodiment 1: For each VLAN in the connectivity group CG (I4, I5):

V3-1 Determine the domain 116-V containing the VLAN (I3)

V3-2 Send the VLAN identification, the identification of domain 116-V, and the user name to the UBNC server Embodiment 2:

V3-1 Send the identification of connectivity group CG and the user name to the UBNC server

APPENDIX E

Step M50: Creating Access Control Lists for Routers

For each router in network 110 (I2-3), for each interface of the router (I7), if the subnet associated with the interface belongs to a connectivity group:

A1 Allow traffic from each shared subnet (I8)

A2 Allow traffic from every other subnet in the same connectivity group (I5, I4)

A3 Deny traffic from all other subnets in network 110 (I1)

A4 Allow traffic from outside of network 110

A5 Open a Telnet session on the router, and send to the router:
(1) a command to remove an existing ACL, if any, from the interface, i.e.:
no access-group 1
(2) the access list;
(3) the commands:
interface vlan_e
access-group 1 out These commands assign the ACL to the router interface labeled "vlan_e"

APPENDIX F

Access Control List for Router Interface 210 to VLAN 140e

| | | |
|---|---|---|
| AL1-1 | access-list 1 permit ip<br>!shared subnet | 10.3.4.0 0.0.0.255 |
| AL1-2a | access-list 1 permit ip<br>!subnet in the same<br>!enterprise connectivity group | 10.1.2.0 0.0.0.255 |
| AL1-2b | access-list 1 permit ip<br>!subnet in the same<br>!enterprise connectivity group | 10.3.2.0 0.0.0.255 |
| AL1-3 | access-list 1 deny ip<br>!all subnets in network 110<br>!outside the same connectivity group | 10.0.0.0 0.255.255.255 |
| AL1-4 | access-list 1 permit ip any<br>!permit access from<br>!outside the network 110 | |

APPENDIX G

Maintenance Algorithms

Converting a Subnet from Unmanaged to a Member of a Connectivity Group

If the subnet has more than one gateway address, the subnet is not made a member of a connectivity group. Otherwise, add the subnet to the connectivity group, and regenerate access control lists for each interface to which a subnet in the same connectivity group is directly attached, as described in Appendix E.

Converting a Subnet from Unmanaged to Shared

Add the subnet to the list I8 of shared subnets (Appendix C). Regenerate the access control list of each router interface to which a subnet in any connectivity group is attached, as described in Appendix E. (The subnet will be added to each ACL.)

Converting a Subnet from Shared to Unmanaged

Remove the subnet from the list I8 of shared subnets (Appendix C). Regenerate the access control list of each router interface to which a subnet in any connectivity group is attached, as described in Appendix E. (The subnet will be removed from each ACL.)

Converting a Subnet from Shared to a Member of a Connectivity Group

If the subnet has more than one gateway address, the subnet is not made a member of a connectivity group. Otherwise, remove the subnet from the list I8 of shared subnets (Appendix C), and add the subnet to the connectivity group (I4 in Appendix C). Regenerate the access control list of each router interface to which a subnet in any connectivity group is attached, as described in Appendix E.

Converting a Subnet from a Member of a Connectivity Group to Unmanaged

Remove the subnet from the connectivity group (I5 in Appendix C). Regenerate the access control list of each router interface to which a subnet in the same connectivity group is directly attached, as described in Appendix E. (The subnet will be removed from each ACL.) Remove, and then regenerate, if necessary, the ACL for the router interface to which the subnet is directly attached, as described in Appendix E. (If there is no other subnet directly connected to the interface, no ACL will be generated. If there is another subnet or subnets, then the appropriate ACL will be generated.)

Converting a Subnet from a Member of a Connectivity Group to Shared

Remove the subnet from the connectivity group (I5 in Appendix C). Remove the ACL for the router interface to which the subnet is directly attached. Regenerate the access control list of each router interface to which a subnet in any connectivity group is directly attached, as described in Appendix E. (The subnet will be removed as a member of the group from some ACLs, but added as a shared subnet to each ACL.)

Moving a Subnet from One Connectivity Group ("old" group) to another ("new" group)

Remove the subnet from the old group and add it to the new group (I5 in Appendix C). Regenerate the ACL of each router interface to which a subnet in either the old or the new connectivity group is directly attached, as described in Appendix E.

Adding a New Communicating Entity (port, MAC address. user, etc.) to a Connectivity Group (see also step M30)

The administrator indicates the connectivity group to which the new entity should belong.

Port 160. The port is associated with a switch 128, which is itself part of a layer 2 domain 116. In the given layer 2 domain, the selected connectivity group is associated with a particular subnet, which is itself bound to a particular VLAN. When the port is assigned to the connectivity group, step V1 (Appendix D) is performed to place the port into the VLAN which is a member of the connectivity group in the layer 2 domain. Note that ports are typically added in groups, as when a multi-port module is added to a switch, or when an entire switch is added to the network. In these cases the entire set of new ports is added to a connectivity group selected by the administrator. The administrator can then change the assignment of the ports one by one, if desired.

MAC address. As is the case with a port, within a particular layer 2 domain, the selected connectivity group is associated with a subnet/VLAN pair. For each layer 2 domain, step V2 (Appendix D) configures all of the switches (or a single controlling switch, depending on the capabilities of the switches) so that the given MAC address is assigned to the designated VLAN.

User. See step V3 in Appendix D.

Moving a Communicating Entity (port, MAC address, user) from One Connectivity Group ("old" group) to another ("new" group) (see also step M30)

Port 160. The port is associated with a VLAN-capable switch 128, which is itself part of a layer 2 domain. In the layer 2 domain, the old and new connectivity groups are associated with particular subnets, which are themselves bound to particular VLANs. (If there is no subnet in the layer 2 domain which belongs to the new connectivity group, then the change is not made.) Management station 124M changes the VLAN assignment of the port to the new VLAN.

MAC address. As is the case with a port, within a particular layer 2 domain, the new connectivity group is associated with a subnet/VLAN pair. For each layer 2 domain, station 124M will configure all of the switches (or a single controlling switch, depending on the capabilities of the switches) so that the given MAC address is assigned to the designated VLAN. If there is no subnet that corresponds to the desired connectivity group in a particular layer 2 domain, then no VLAN assignment is made for the MAC address in that layer 2 domain. If the MAC address appears in the layer 2 domain as a result of a move or because the MAC address is assigned to a laptop or other mobile computer that is plugged into the layer 2 domain, then the switch will take whatever action it normally takes when an unknown MAC address appears.

User. See step V3 in Appendix D

Adding a New Router Interface/VLAN/Subnet

If the new router interface 210 has no directly connected subnets (no gateway addresses) then no action is required. Otherwise the interface has one or more gateway addresses and corresponding directly connected subnets. For each directly connected subnet:

1. If the subnet is already a member of a connectivity group (and thus is directly connected to an interface of another router), then the subnet is converted into a shared subnet. See the process above for converting a subnet from a member of a connectivity group to a shared subnet.
2. Else if the subnet is already designated as shared or unmanaged, then no action is required.
3. Else the subnet is a new subnet. Add the subnet to the list I8 of shared subnets (Appendix C). Regenerate the access control list of each router interface to which a subnet in any connectivity group is directly attached, as described in Appendix E. (The subnet will be added to each ACL as a shared subnet.) If the subnet is in a layer 2 domain containing VLAN-capable switches 128, then a new VLAN is created in the domain and associated with the new subnet.

Adding a New Router

A new router 130 may have a number of interfaces. For each router interface, the actions listed above for new router interfaces are performed.

Adding a New VLAN-capable Switch

The new VLAN-capable switch 128 is added to a layer 2 domain in which there is a subnet assigned to the management connectivity group, and there is a VLAN that corresponds to this group.

If the switch implements port-based VLANs, then all ports in the switch and the management stack of the switch are assigned to the VLAN corresponding to the subnet in the management connectivity group. In addition, the switch is assigned an IP address from this subnet. For example, if the subnet 10.50.3.0/24 were the subnet in the layer 2 domain which is assigned to the management group, and if VLAN 3 were the VLAN associated with subnet 10.50.3.0/24, one would issue a command like the following at the console of a Cisco Catalyst 5000 series switch in order to assign it an address in the management connectivity group:

set interface sc0 3 10.50.3.200 255.255.255.0 10.50.3.255 where sc0 is the designator for the switch's management stack, 3 is the VLAN that corresponds to subnet 10.50.3.0/24, 10.50.3.200 is the IP address in subnet 10.50.3.200/24 assigned to the management stack of the switch, 255.255.255.0 is the subnet mask for subnet 10.50.3.0/24, and 10.50.3.255 is the broadcast address.

If the switch implements MAC address-based VLANs, then the MAC address of the management stack is assigned to the VLAN corresponding to the subnet in the management connectivity group. As with port-based VLANs, the switch is assigned an IP address from this subnet.

Adding a New Connectivity Group

A new (empty) connectivity group may be added at any time. How to add a subnet to a connectivity group is discussed above.

We claim:

1. A method for creating one or more connectivity groups in a network which comprises a plurality of domains, wherein each network station can have a first type address and a second type address, wherein traffic within each of said domains is delivered using first type addresses of destination network stations without using second type addresses of destination network stations, but between domains traffic is transferred using the second type addresses of destination network stations, the method comprising:

(1) for each domain D1 of at least two of said domains, a computer system obtaining identifiers of virtual broadcast domains (VBDs) in the domain D1;

(2) for each connectivity group, the computer system obtaining information identifying the one or more VBDs that are members of the connectivity group, wherein at least one of the connectivity groups comprises VBDs in different domains;

(3) for at least one connectivity group, the computer system obtaining information identifying one or more entities that are to be made members of the connectivity group, each entity being a first type address of a network station;

(4) for at least one first type address entity A1 which is to be made a member of a connectivity group C1 comprising VBDs in different domains, for each VBD V2 in the connectivity group C1 as defined by information in (2), the computer system performing the following operations:

(4A) using information in (1), determining a domain D2 containing the VBD V2;

(4B) causing the domain D2 to place the entity A1 into the VBD V2.

2. A computer readable medium comprising one or more computer instructions which are to implement the method of claim 1 as they are executed by the computer system.

3. A computer system programmed to implement the method of claim 1.

4. A method for creating one or more connectivity groups in a network which comprises a plurality of domains, wherein each network station can have a first type address and a second type address, wherein traffic within each of said domains is delivered using first type addresses of destination network stations without using second type addresses of destination network stations, but between domains traffic is transferred using the second type addresses of destination network stations, the method comprising:

(1) for each domain D1 of at least two of said domains, a computer system obtaining identifiers of virtual broadcast domains (VBDs) in the domain D1;

(2) for each connectivity group, the computer system obtaining information identifying the one or more VBDs that are members of the connectivity group, wherein at least one of the connectivity groups comprises VBDs in different domains;

(3) for at least one connectivity group, the computer system obtaining information identifying one or more entities that are to be made members of the connectivity group, each entity being an identification of a user capable of using different network stations;

(4) for at least one entity U1 which is to be made a member of a connectivity group C1 comprising VBDs in different domains, for each VBD V2 in the connectivity group C1, the computer system causing the network to place the user into the VBD V2.

5. The method of claim 4 wherein the operation (4) comprises, for each VBD V2 in the connectivity group C1 as defined by information in (2), the computer system using information in (1) to determine a domain D2 containing the VBD V2, and causing the network to bind the user to the VBD V2 if the user logs on in the domain D2.

6. A computer readable medium comprising one or more computer instructions which are to implement the method of claim 4 as they are executed by the computer system.

7. A computer system programmed to implement the method of claim 4.

8. A method for restricting traffic between network stations in a network comprising a plurality of domains, wherein:

each network station can have both a first type address and a second type address;

traffic between network stations within each of the domains is delivered to destination network stations using first type addresses of the destination network stations without using second type addresses of the destination network stations, but between domains traffic is transferred, and is restrictable, using the second type addresses of the destination network stations, the method comprising:

(A) a computer system receiving from a network station, over the network, a user identification;

(B) the computer system determining, from the user identification, a connectivity group CG1 to which the user identification belongs, wherein:

the connectivity group CG1 contains a plurality of virtual broadcast domains (VBDs), each VBD being one of said domains or a sub-domain of one of said domains, wherein traffic between network stations within a sub-domain VBD is restrictable to the VBD; and wherein the connectivity group CG1 contains VBDs in different domains;

(C) the computer system determining a domain D1 to which the network station belongs;

(D) the computer system determining one or more VBDs VBD1 which are both in the domain D1 and in the connectivity group CG1, the one or more VBDs VBD1 being less than the entire domain D1; and (E) the computer system issuing a command to bind the network station to the one or more VBDs VBD1 so as to restrict the network station's traffic within the domain D1.

9. The method of claim 8 wherein each VBD is a sub-domain of a domain capable of restricting broadcast traffic to the VBD in which the traffic originates.

10. The method of claim 9 wherein each VBD is a VLAN.

11. The method of claim 8 further comprising:

(1) storing information which defines, for each of at least two domains, which VBD or VBDs belong to each domain;

(2) storing information which defines, for each of one or more connectivity groups, which VBD or VBDs belong to each connectivity group; and (3) storing information which defines, for at least one user identification, a connectivity group to which the user identification belongs;

wherein:

in the operation (B), the connectivity group CG1 is determined from the information in (3);

in the operation (D), the one or more VBDs are determined from the information in (1) and the information in (2).

12. The method of claim 8 further comprising the computer system receiving a second type address of the network station, wherein the computer system determines the domain D1 from the second type address of the network station.

13. The method of claim 8 wherein the user identification is a user name supplied by a user when the user logs on at the network station.

14. The method of claim 8 wherein the first type addresses are layer 2 addresses, and the second type addresses are network layer addresses.

15. The method of claim 8 wherein the first type addresses are MAC addresses, and the second type addresses are IP addresses.

16. A computer readable medium comprising one or more computer instructions which are to implement the method of claim 8 as they are executed by the computer system.

17. A computer system programmed to implement the method of claim 8.

18. A structure for restricting traffic between network stations in a network comprising a plurality of domains, wherein:

each network station can have both a first type address and a second type address;

traffic between network stations within each of the domains is delivered to destination network stations using first type addresses of the destination network stations without using second type addresses of the destination network stations, but between domains traffic is transferred, and is restrictable, using the second type addresses of the destination network stations, the structure comprising:

means for receiving from a network station, over the network, a user identification;

means for determining, from the user identification, a connectivity group CG1 to which the user identification belongs, wherein:

the connectivity group CG1 contains a plurality of virtual broadcast domains (VBDs), each VBD being one of said domains or a sub-domain of one of said domains, wherein traffic between network stations within a sub-domain VBD is restrictable to the VBD; and wherein the connectivity group CG1 contains VBDs in different domains;

means for determining a domain D1 to which the network station belongs;

means for determining one or more VBDs VBD1 which are both in the domain D1 and in the connectivity group CG1, the one or more VBDs VBD1 being less than the entire domain D1; and means for issuing a command to bind the network station to the one or more VBDs VBD1 so as to restrict the network station's traffic within the domain D1.

19. The structure of claim 18 wherein each VBD is a sub-domain of a domain capable of restricting broadcast traffic to the VBD in which the traffic originates.

20. The structure of claim 19 wherein each VBD is a VLAN.

21. The structure of claim 18 wherein the structure comprises (1) a computer system, and (2) a program loaded into the computer system, the computer system and the program comprising each of said determining means.

22. The structure of claim 18 wherein the structure is a computer readable medium and wherein each means comprises one or more computer instructions, computer readable data, or a combination of one or more instructions and data.

23. The structure of claim 18 further comprising storage for storing:
   (1) information which defines, for each of at least two domains, which VBD or VBDs belong to each domain;
   (2) information which defines, for each of one or more connectivity groups, which VBD or VBDs belong to each connectivity group; and
   (3) information which defines, for at least one user identification, a connectivity group to which the user identification belongs;
   wherein:
      means for determining the connectivity group CG1 is to determine the connectivity group CG1 from the information (3);
      means for determining the one or more VBDs which are both in the domain D1 and in the connectivity group CG1 is to determine the one or more VBDs from the information in (1) and the information in (2).

24. The structure of claim 18 further comprising means for receiving a second type address of the network station, wherein means for determining the domain D1 is to determine the domain D1 from the second type address of the network station.

25. The structure of claim 18 wherein the user identification is a user name supplied by a user when the user logs on at the network station.

26. The structure of claim 18 wherein the first type addresses are layer 2 addresses, and the second type addresses are network layer addresses.

27. The structure of claim 18 wherein the first type addresses are MAC addresses, and the second type addresses are IP addresses.

28. A computer readable medium comprising one or more computer instructions which are to implement the method of claim 23 as they are executed by the computer system.

29. A computer system programmed to implement the method of claim 23.

30. A method for creating one or more access control lists (ACLs) for one or more devices that route traffic between network domains, wherein:
   each network station can have both a first type address and a second type address;
   traffic between network stations within each of the domains is delivered to destination network stations using first type addresses of the destination network stations without using second type addresses of the destination network stations, but the one or more devices route traffic between domains using the second type addresses of the destination network stations, and wherein the one or more devices are capable of restricting traffic between domains based on ACLs which specify allowed and/or disallowed traffic through use of the second type addresses,
   the method comprising:
      defining one or more groups of sub-networks such that traffic is to be allowed within each group of sub-networks, wherein each sub-network is a portion of a network domain or is a whole network domain, and, for each group, providing to a computer system identifications of sub-networks that belong to the group, wherein at least one group G1 comprises sub-networks in different domains; and
      the computer system generating the one or more ACLs to allow traffic within each group,
      wherein the one or more devices are to have an interface designated to transfer traffic for a sub-network S1 in the group G1;
      wherein generating the one or more ACLs comprises generating an ACL ACL1 for said interface, and wherein for each sub-network S2 in the group G1 (S2≠S1), the ACL ACL1 allows the traffic on the interface between the sub-network S2 and the sub-network S1.

31. The method of claim 30 comprising defining a plurality of said groups, wherein the one or more ACLs disallow traffic between sub-networks in different groups.

32. The method of claim 30 further comprising the computer system receiving an identification of one or more shared sub-networks, wherein traffic is to be allowed between each shared sub-network and any other sub-network in any one of the groups,
   wherein the one or more ACLs allow traffic between any one of the shared sub-networks and any sub-network in any one of the groups.

33. The method of claim 30, wherein:
   at least one of the domains is capable of restricting traffic in the domain; and
   the method further comprises:
      for each of one or more groups, the computer system receiving information to identify traffic allowed and/or disallowed within the group, wherein the information is to be used by one or more domains in restricting traffic; and
      the computer system configuring each domain capable of restricting traffic so as to allow and/or disallow traffic as specified by said information.

34. The method of claim 33 wherein information to identify traffic allowed and/or disallowed within a group comprises an identification of one or more of: (1) ports of one or more switches each of which forwards traffic within a domain capable of restricting traffic, wherein the ports are to carry traffic within the group, (2) physical addresses of entities belonging to the group, and (3) user names allowed to send or receive traffic within the group.

35. The method of claim 30 wherein each sub-network identification is an address or an address range.

36. The method of claim 30 wherein the one or more devices route traffic based on IP addresses, and within each domain traffic is forwarded between stations based on physical addresses.

37. A structure for creating one or more access control lists (ACLs) for one or more devices that route traffic between network domains, wherein:
   each network station can have both a first type address and a second type address;
   traffic between network stations within each of the domains is delivered to destination network stations using first type addresses of the destination network stations without using second type addresses of the destination network stations, but the one or more devices route traffic between domains using the second type addresses of the destination network stations, and wherein the one or more devices are capable of restricting traffic between domains based on ACLs which specify allowed and/or disallowed traffic through use of the second type addresses, the structure comprising:

means for defining for a computer system one or more groups of sub-networks such that traffic is to be allowed within each group, wherein each sub-network is a portion of a network domain or is a whole network domain, the means being also for reading by the computer system, for each group, identifications of sub-networks that belong to the group, wherein at least one group G1 comprises sub-networks in different domains; and means for generating by the computer system the one or more ACLs to allow traffic within each group, wherein the one or more devices are to have an interface designated to transfer traffic for a sub-network S1 in the group G1;

wherein generating the one or more ACLs comprises generating an ACL ACL1 for said interface, and wherein for each sub-network S2 in the group G1 (S2≠S1), the ACL ACL1 allows the traffic on the interface between the sub-network S2 and the sub-network S1.

38. The structure of claim 37 wherein the structure comprises the computer system and a program loaded into the computer system, the combination of the computer system and the program comprising the defining means and the generating means.

39. The structure of claim 37 wherein the structure is a computer readable medium comprising instructions to implement the defining means and the generating means.

40. The structure of claim 37 wherein the one or more ACLs disallow traffic between sub-networks in different groups when the defining means defines a plurality of groups.

41. The structure of claim 37 further comprising means for reading by the computer system an identification of one or more shared sub-networks, wherein traffic is to be allowed between each shared sub-network and any other sub-network in any one of the groups, wherein the one or more ACLs allow traffic between any one of the shared sub-networks and any sub-network in any one of the groups.

42. The structure of claim 37, wherein:

at least one of the domains is capable of restricting traffic in the domain; and the structure further comprises:

means for reading by the computer system, for each of one or more groups, information to identify traffic allowed and/or disallowed within the group, wherein the information is to be used by one or more domains in restricting traffic; and means for configuring by the computer system each domain capable of restricting traffic so as to allow and/or disallow traffic as specified by said information.

43. The structure of claim 42 wherein information to identify traffic allowed and/or disallowed within a group comprises an identification of one or more of: (1) ports of one or more switches each of which forwards traffic within a domain capable to restrict traffic, wherein the one or more ports are to carry traffic within the group, (2) physical addresses of entities belonging to the group, and (3) user names allowed to send or receive traffic within the group.

44. The structure of claim 37 wherein each sub-network identification is a second type address or a second type address range.

45. The structure of claim 37 wherein the one or more devices route traffic based on IP addresses, and within each domain traffic is forwarded between stations based on physical addresses.

46. A method for establishing connectivity in a network comprising a plurality of domains, wherein:

each network station can have both a first type address and a second type address;

traffic between network stations within each of the domains is delivered to destination network stations using first type addresses of the destination network stations without using second type addresses of the destination network stations, but between domains traffic is transferred, and is restrictable, using the second type addresses of the destination network stations;

at least one domain is capable of having sub-domains defined in the domain such that the domain allows traffic within a single sub-domain but disallows traffic between sub-domains, the method comprising:

providing a computer system with information INF1 defining traffic that belongs to a connectivity group CG1, wherein the connectivity group CG1 is to have sub-domains in different domains at least two of which are each capable of restricting traffic to a sub-domain; and for at least the connectivity group CG1, the computer system configuring each domain D1 that has a sub-domain SD1 in the connectivity group CG1 so that the domain D1 allows traffic defined by said information INF1 but restricts such traffic to the sub-domain SD1 when the domain delivers traffic using the first type addresses without using the second type addresses.

47. The method of claim 46 wherein the information defining traffic comprises, for at least one group, an identification of one or more of: (1) ports of one or more switches each of which forwards traffic within a single domain, wherein the one or more ports are to carry traffic within the group, (2) physical addresses of stations that are members of the group, and (3) user names allowed to send or receive traffic within the group.

48. The method of claim 47 wherein configuring of each domain comprises, for a switch that forwards traffic within a single domain having a sub-domain in the group, configuring the switch to: (a) allow traffic between physical addresses of stations that are members of the group and (b) disallow traffic between physical addresses of stations that are members of different groups.

49. A structure for establishing connectivity in a network comprising a plurality of domains, wherein:

each network station can have both a first type address and a second type address;

traffic between network stations within each of the domains is delivered to destination network stations using first type addresses of the destination network stations without using second type addresses of the destination network stations, but between domains traffic is transferred, and is restrictable, using the second type addresses of the destination network stations;

at least one domain is capable of having sub-domains defined in the domain such that the domain allows traffic within a single sub-domain but disallows traffic between sub-domains, the structure comprising:

means for receiving, by a computer system, information INF1 defining traffic that belongs to a connectivity group CG1, wherein the connectivity group CG1 is to have sub-domains in different domains at least two of which are each capable of restricting traffic to a sub-domain;

means for receiving by the computer system, for at least one connectivity group, identifications of sub-domains that are members of the connectivity group; and means for configuring by the computer system, for at least the connectivity group CG1, each domain D1 that has a sub-domain SD1 in the connectivity group CG1 so that the domain D1 allows traffic defined by said information INF1 but restricts such traffic to the sub-domain SD1 when the domain D1 delivers traffic using the first type addresses without using the second type addresses.

50. The structure of claim 49 wherein the information defining traffic comprises, for at least one group, an identification of one or more of: (1) ports of one or more switches each of which forwards traffic within a single domain, wherein the one or more ports are to carry traffic within the group, (2) physical addresses of stations that are members of the group, and (3) user names allowed to send or receive traffic within the group.

51. The structure of claim 49 wherein the structure comprises the computer system and a program loaded into the computer system, the combination of the computer system and the program comprising all of said means.

52. The structure of claim 49 wherein the structure is a computer readable medium comprising instructions to implement all of said means.

53. The structure of claim 49 wherein traffic within each domain is forwarded between stations based on the stations' physical addresses, and traffic between domains is routed based on stations' logical addresses.

54. A method for restricting traffic between network stations in a network comprising a plurality of layer 2 domains, wherein traffic between network stations within each layer 2 domain is delivered to destination network stations using layer 2 addresses of the destination network stations without using network layer addresses of the destination network stations, but between domains traffic is transferred, and is restrictable, using the network layer addresses of the destination network stations, the method comprising:

(A) a computer system receiving from a network station, over the network, a user identification, and also receiving an address of the network station;

(B) the computer system determining, from the user identification, a connectivity group CG1 to which the user identification belongs, wherein:
the connectivity group CG1 contains a plurality of VLANs, each VLAN being one of said domains or a sub-domain of one of said domains, wherein traffic between network stations within a sub-domain VLAN is restricted to the VLAN, but traffic between destination stations in VLANs in different domains is restricted to a connectivity group using the network layer addresses of the destination network stations; and
wherein the connectivity group CG1 contains VLANs in different domains;

(C) the computer system determining, from the address of the network station, the domain D1 to which the network station belongs;

(D) the computer system determining one or more VLANs which are both in the domain D1 and in the connectivity group CG1; and (E) the computer system issuing a command to bind the network station to the one or more VLANs which are both in the domain D1 and in the connectivity group CG1 to restrict the network station's traffic within the domain D1.

55. The method of claim 54 further comprising:

(1) storing information which defines, for each of at least two domains, which VLAN or VLANs belong to each domain;

(2) storing information which defines, for each of one or more connectivity groups, which VLAN or VLANs belong to each connectivity group; and (3) storing information which defines, for at least one user identification, a connectivity group to which the user identification belongs; and (4)
wherein:
in the operation (B), the connectivity group CG1 is determined from the information in (3);
in the operation (D), the one or more VLANs are determined from the information in (1) and the information in (2).

56. A method for creating one or more connectivity groups in a network which comprises a plurality of domains, wherein each network station can have a first type address and a second type address, wherein traffic within each of said domains is delivered using first type addresses of destination network stations without using second type addresses of destination network stations, but between domains traffic is transferred using the second type addresses of destination network stations, the method comprising:

(1) for each domain D1 of at least two of said domains, a computer system obtaining identifiers of virtual broadcast domains (VBDs) in the domain D1;

(2) for each connectivity group, the computer system obtaining information identifying the one or more VBDs that are members of the connectivity group, wherein at least one of the connectivity groups comprises VBDs in different domains;

(3) for at least one connectivity group, the computer system obtaining information identifying one or more port entities that are to be made members of the connectivity group, each port entity being a port of a device capable of forwarding traffic within a domain using the first type addresses of destination network stations without using the second type addresses of destination network stations;

(4) for each domain, the computer system obtaining information on which ports, if any, the domain contains;

(5) for at least one port entity P1 which is to be made a member of a connectivity group C1 comprising VBDs in different domains, the computer system performing the following operations:
(5A) determining from the information in (4), a domain D2 to which the port entity belongs;
(5B) from the information in (2) and VBD identifiers for each domain in (1), determining a VBD V2 which is both in the domain D2 and the connectivity group C1;
(5C) causing the domain D2 to place the port entity P1 into the VBD V2.

57. A computer readable medium comprising one or more computer instructions which are to implement the method of claim 56 as they are executed by the computer system.

58. A computer system programmed to implement the method of claim 56.

* * * * *